United States Patent

[11] 3,549,926

| [72] | Inventor | Alex M. Pentland<br>Ann Arbor, Mich. |
|------|----------|------|
| [21] | Appl. No. | 796,665 |
| [22] | Filed | Feb. 5, 1969 |
| [45] | Patented | Dec. 22, 1970 |
| [73] | Assignee | Ford Motor Company<br>Dearborn, Mich.<br>a corporation of Delaware |

[54] INSULATED COIL FOR USE IN A DYNAMOELECTRIC MACHINE
12 Claims, 18 Drawing Figs.

[52] U.S. Cl. .................................................. 310/194,
174/117; 310/213; 336/206
[51] Int. Cl. .................................................. H02k 3/32
[50] Field of Search .......................................... 310/214,
208, 213, 218, 194, 201, 254, 258, 259, 180;
174/117, 119, 129; 29/606, 602, 596, 598;
336/206, 223

[56] References Cited
UNITED STATES PATENTS

| 3,340,414 | 9/1967 | Woodman | 310/194 |
| 3,396,230 | 8/1968 | Crimmins | 174/117X |
| 3,108,200 | 10/1963 | Baldwin | 310/214X |
| 986,291 | 3/1911 | Honold | 336/206X |
| 1,118,446 | 11/1914 | Roos | 336/206 |
| 1,864,331 | 6/1932 | Whitesmith | 29/606X |
| 3,449,607 | 6/1969 | Sargent | 310/214X |

FOREIGN PATENTS

| 553,448 | 1923 | France | 174/117 |

Primary Examiner—Milton O. Hirshfield
Assistant Examiner—B. A. Reynolds
Attorneys—John R. Faulkner and Keith L. Zerschling ABSTRACT: The disclosure relates to a dynamoelectric machine having a housing member constructed of ferromagnetic material and a pole member constructed of ferromagnetic material affixed to the housing member. A coil constructed of a number of turns of a conductor has the conductor enclosed by a sheet of insulating material. This insulating material has at least one excess tab extending from the conductor. The tab is positioned in engagement with the ferromagnetic material of one of the members to act as a cushion for holding the coil in position between the housing member and the pole member.

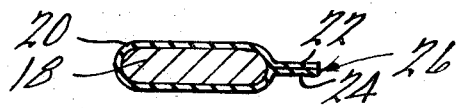
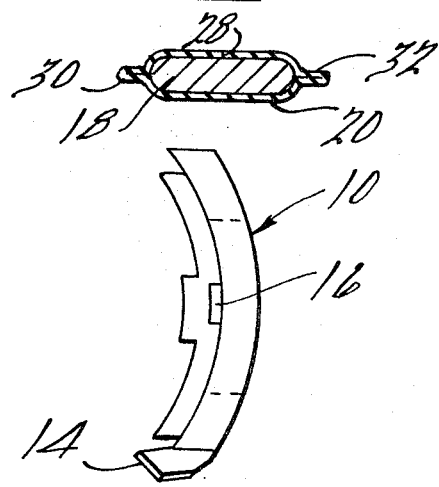
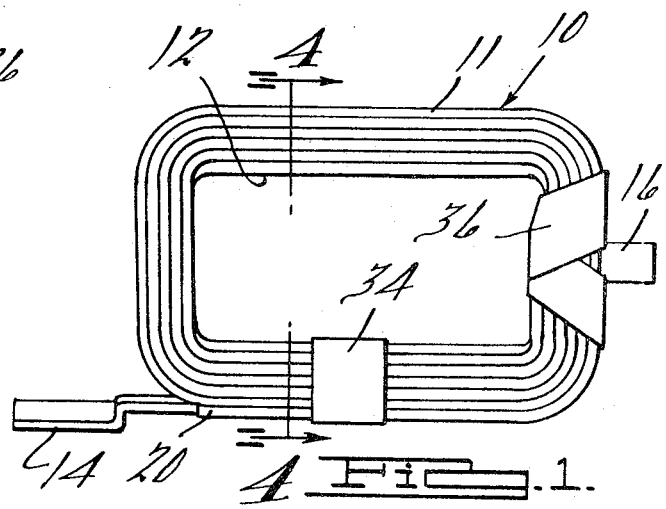
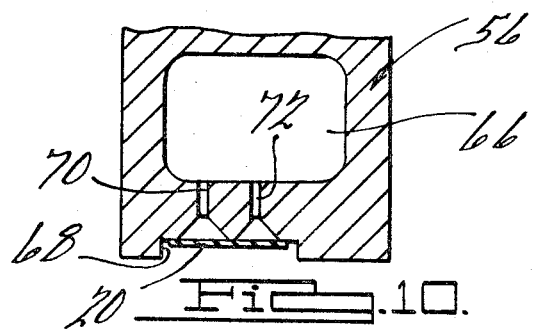
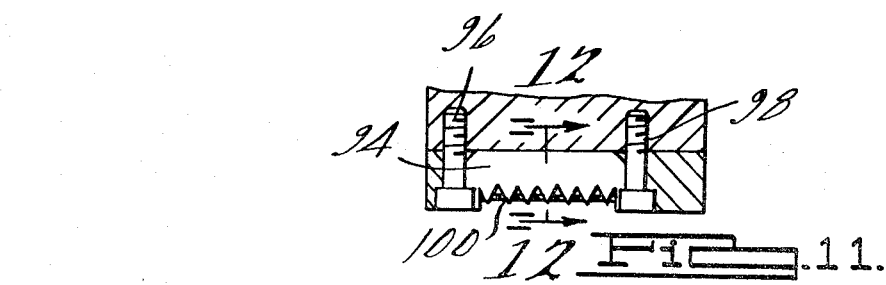
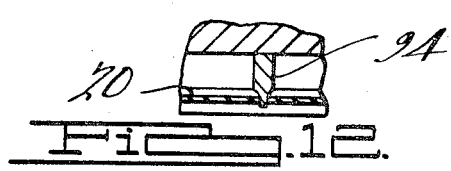

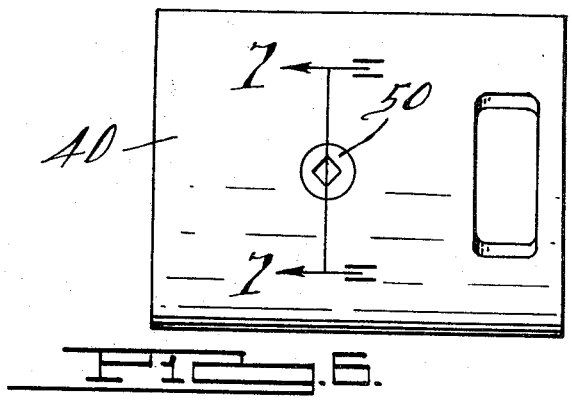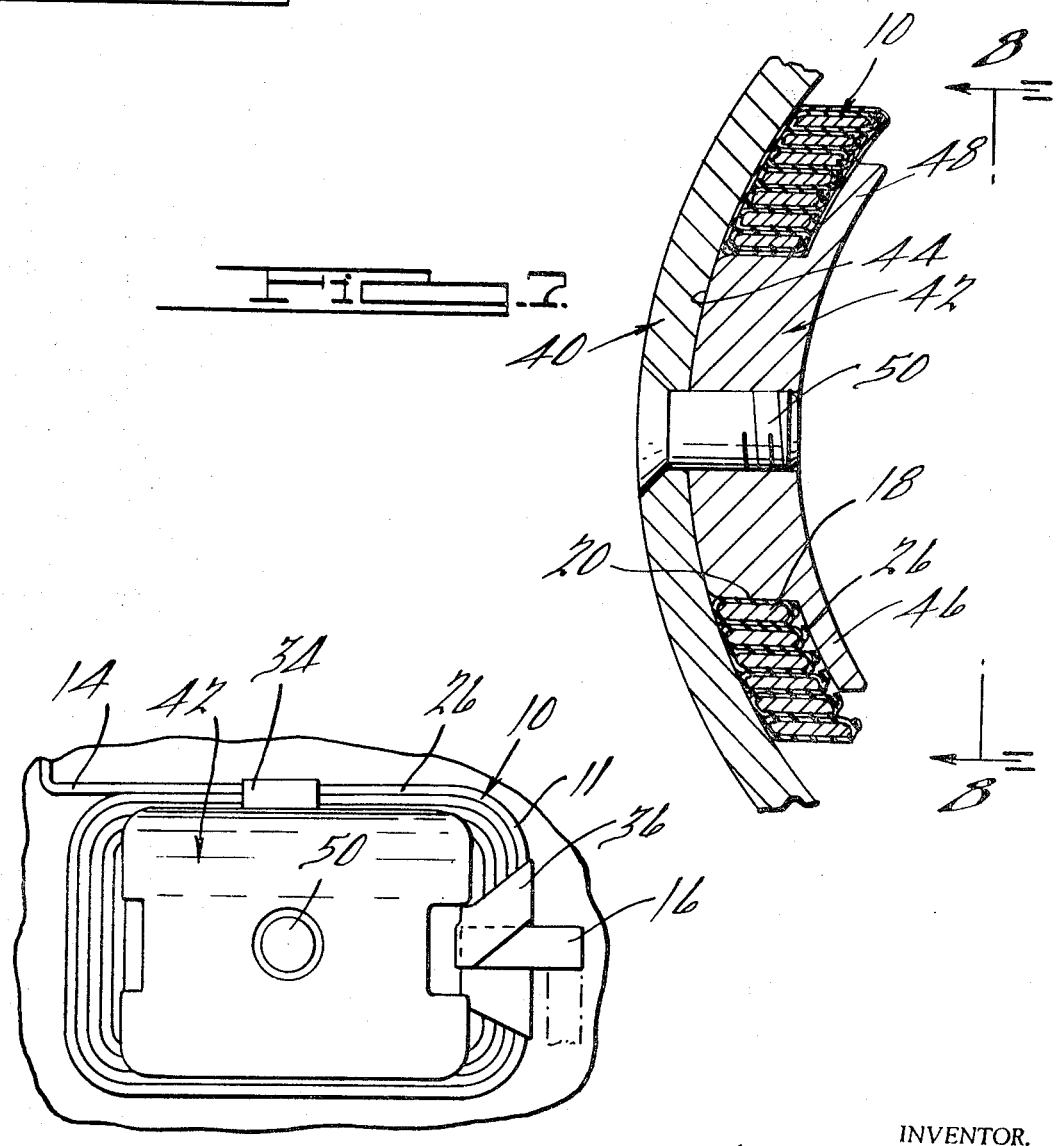

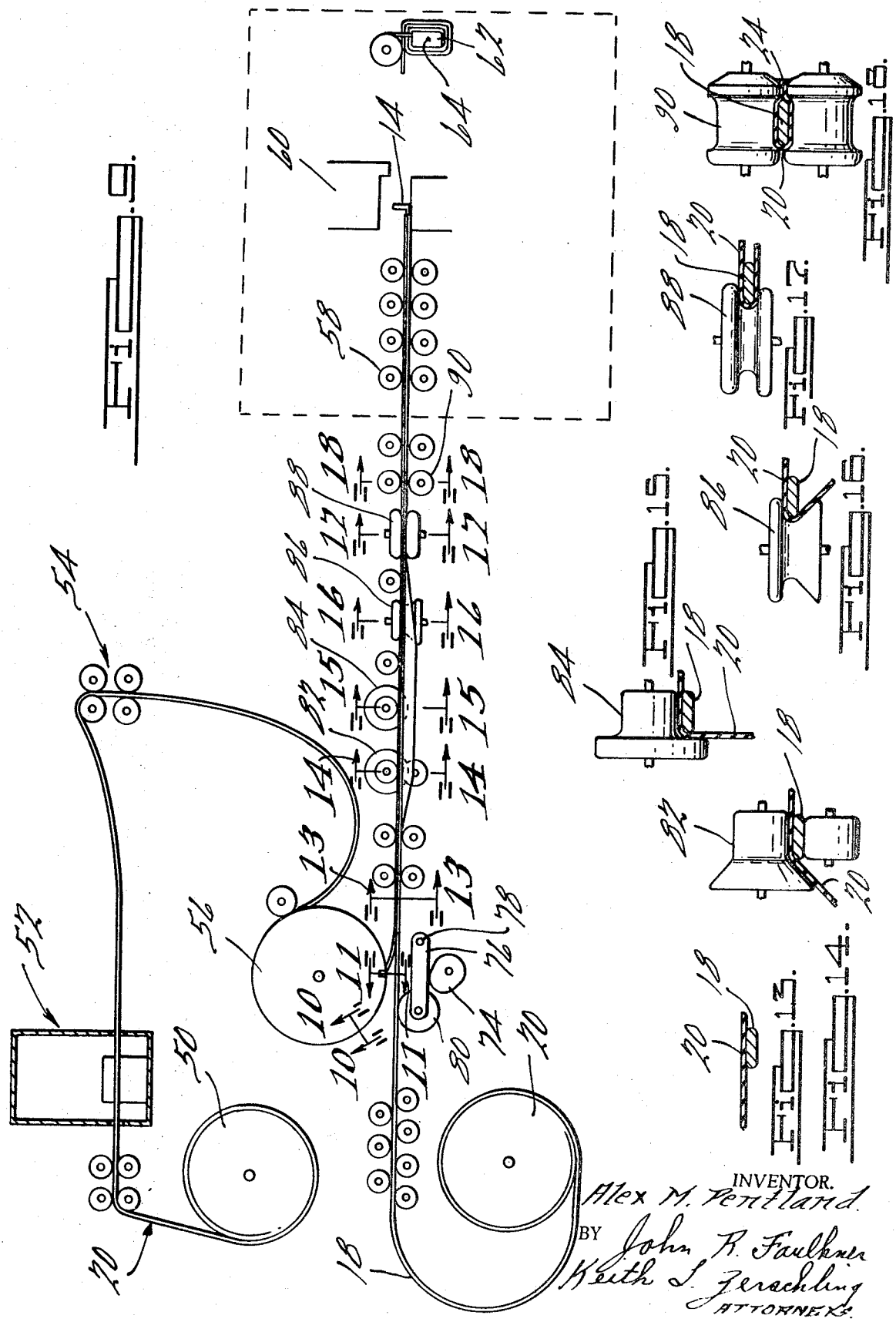

INSULATED COIL FOR USE IN A DYNAMOELECTRIC MACHINE

BACKGROUND OF THE INVENTION

This invention relates to a dynamoelectric machine and more particularly to a dynamoelectric machine having a wound coil which may function as the field winding of the machine.

Field coils for a dynamoelectric machine of medium size are usually insulated with a separating paper fed between turns of flat wire or conductor. When the coil has been wound with the alternating flat wire or conductor and paper, it is then wrapped with a paper or cloth tape and, if required, is dipped in a plastic material which may subsequently be cured by heat treating.

The present invention replaces the separating paper mentioned above with a paper or cloth tape which is folded around the wire or conductor prior to winding the wire into a coil. The most practical system involves placing an adhesive on the paper or cloth tape and wrapping it around the wire or conductor, and the coil is then wound in automatic equipment which forms an end on the coil and winds it. The tape is applied to the wound portion of the coil, but not to the formed ends since the bends at the formed ends are too severe for the tape. Additionally, electrically clean coil ends are necessary to enable connections to be soldered or brazed to these ends.

Since the tape is not applied to the ends of the wire, stripping is eliminated and the tape may be applied to the flat wire or conductor as a tight wrap with a butt or a lap joint. Excess tape is used at the wire or conductor edges to form tabs which are used as a cushion in holding the coil firmly within the dynamoelectric machine.

The excess tape, or tabs, at the edges of the wire or conductor is positioned in engagement with either the housing member or the pole member, or both of them, within the dynamoelectric machine. The excess tape or tabs serve as a cushion to hold the coil firmly in position in the machine while preventing any shorting or other electrical insulation failure.

BRIEF DESCRIPTION OF THE DRAWINGS

FIG. 1 is a plan view of a pretaped coil for a dynamoelectric machine.

FIG. 2 is a sectional view through a wire or conductor forming the coil of FIG. 1.

FIG. 3 is a sectional view through an alternate embodiment of the wire or conductor forming the coil of FIG 1.

FIG. 4 is a sectional view taken along the lines 4—4 of FIG. 1.

FIG. 5 is an end elevational view of the coil shown in FIG 1 after it is formed into a generally arcuate configuration for installation in a dynamoelectric machine.

FIG. 6 is a plan view of a housing member of a dynamoelectric machine of the present invention.

FIG 7 is a sectional view taken along the lines 7—7 of FIG. 6.

FIG 8 is an elevational view taken along the lines 8—8 of FIG. 7.

FIG. 9 is a schematic view of the taping and winding mechanism for making the coil shown in FIG. 1.

FIG. 10 is a sectional view taken along the lines 10—10 of FIG. 9.

FIG. 11 is a sectional view taken along the lines 11—11 of FIG. 9.

FIG. 12 is a sectional view taken along the lines 12—12 of FIG. 11.

FIG. 13 is a sectional view taken along the lines 13—13 of FIG. 9.

FIG. 14 is a sectional view partially in elevation taken along the lines 14—14 of FIG. 9.

FIG. 15 is a sectional view partially in elevation taken along the lines 15—15 of FIG. 9.

FIG. 16 is a sectional view partially in elevation taken along the lines 16—16 of FIG. 9.

FIG. 17 is a sectional view partially in elevation taken along the lines 17—17 of FIG. 9.

FIG. 18 is a sectional view partially in elevation taken along the lines 18—18 of FIG. 9.

DESCRIPTION OF THE PREFERRED EMBODIMENT

Referring now to the drawings in which like reference numerals designate like parts throughout the several views thereof, there is shown in FIG. 1 the coil 10 of the present invention which comprises a plurality of turns 11 formed into a generally rectangular configuration, with a generally rectangular aperture 12. The end portions 14 and 16 of the coil 10 are bare copper wire or conductor for connection to an external circuit, while the remainder of the copper wire or conductor in the coil 10 that comprises the turns 11 is covered with a thin sheet of insulating material.

This structure is shown more specifically in FIG. 2 in which the conductor or wire 18 is of generally oblong, or rectangular, configuration and is enclosed by a thin sheet of insulating material 20 having excess material 22 and 24 extending from the conductor in direction of the longer axis of the oblong cross section. This thin sheet of insulating material 20 may be a paper insulating material, for example, crepe paper, having a thickness of .005 inch. A suitable adhesive is applied, as will be explained subsequently, to the inner surface of the crepe paper and this adhesive fastens the thin sheet of insulating material 20 to the conductor 18 and the excess material 22 and 24 at the edge thereof is adhered together to form a tab 26.

In alternate construction shown in FIG. 3 the thin sheet of insulating material 20 may be formed about the conductor 18 to provide a butt joint 28 at the center of the conductor. Excess material forms tabs 30 and 32 on either side of the conductor 18, with the adhesive joining two thicknesses of the sheet 20 to provide the tabs.

The turns 11 forming coil 10, of course, have the thin insulating sheet 20 positioned thereon with the tabs 26 extending therefrom. These turns are wrapped at 34 and 36 with a suitable pressure sensitive adhesive tape to hold the turns 11 of the coil 10 in proper position. When the coil comes out of a winding machine, it will appear in cross section as shown in FIG. 4 with the tabs 26 partially bent over and at an angle with respect to the axis of the longer dimension of the conductor 18. The coil 10 will also be in a generally planer form and must then be shaped into a generally arcuate form as shown in FIG. 5. This may be done by a suitable mandrel or press and is accomplished so that the coil may be positioned properly within a cylindrical housing member 40 of a dynamoelectric machine as shown in FIG. 6 through 8.

Referring now to FIG. 6 the dynamoelectric machine housing member 40 is constructed of a ferromagnetic material and is generally cylindrical in configuration. This housing member carries a ferromagnetic pole piece or member 42, as seen in FIGS. 7 and 8. The pole piece or member 42 includes a surface 44 having a radius of curvature substantially equal to the radius of curvature of the cylindrical housing member 40, and this surface 44 fits flush against the inner surface of the housing member 40. The pole piece or member 42 has a pair of arcuate extending inner flanges 46 and 48 that preferably have radii of curvature equal to the radius of curvature of the inner surface 44 and equal to the radius of curvature of the inner surface of the cylindrical housing member 40. The pole piece of member 42 is fixed to the housing 40 by means of a threaded bolt 50.

The coil 10 is positioned between the inner surface of the housing 40 and the surfaces of the flanges 46 and 48 formed on the pole piece or member 42. The tabs 26 formed of the thin sheet of insulating material engage the inner surfaces of the flanges 46 and 48 as shown in FIG. 7 to properly hold and cushion the coil 10 in position in the dynamoelectric machine. In the alternative, the tabs 26 may engage the inner surface of the housing member 40.

If the conductors 18 are wrapped as shown in FIG. 3 to form the tabs 30 and 32 on either side of the conductor 18, then the tabs would be positioned in engagement with both the inner surfaces of the flanges 46 and 48 on the pole piece, or member, 42 and the inner surface of the housing 40.

The preferred form of the invention is that shown in FIG. 2 in which the conductor 18 is wrapped with the thin sheet of insulating material with the tab 26 extending from the edge of the conductor and in a direction along the longer axis of the conductor. This may be accomplished with the wrapping and coil forming machinery shown schematically in FIG. 9. This machinery includes a supply reel 50 for the thin sheet of insulating material 20 and an adhesive applicator 52 that applies an adhesive to one side of the thin sheet of insulating material 20. The thin sheet of insulating material 20 is pulled from the supply reel 50 through the adhesive applicator 52 by means of feed rolls 54. From the feed rolls 54 the thin sheet of insulating material 20 is fed to a measuring and cutoff roll 56.

The conductor 18 is positioned on a supply reel 20 and is pulled from this supply reel via conductor or wire feed rolls 58. The conductor feed rolls 58 are included in an automatic winding machine that also includes a die 60 for cutting off and forming the end 14 of the coil 10 and a winding mandrel 62 that turns about an axis 64 for winding the conductor 11, with the thin sheet of insulating material 20 positioned thereon as shown in FIG. 2, into the coil 10 shown in FIG. 1.

The measuring and cutoff roll 56 is operated in timed relationship with the winding mandrel 62 and rotates with a surface speed matching the speed of the conductor until it makes one complete revolution. At this time the roll 56 is stopped, while the conductor continues to move an additional distance necessary to provide a desired length of bare wire.

The roll 56 has a general cross section as shown in FIG. 10 and includes an annular vacuum manifold 66 connected to a suitable source of vacuum (not shown). This vacuum is applied from manifold 66 to a peripheral groove 68 formed in the outer surface of the roll 56 through a plurality of pairs of openings, with one of the pairs identified by reference numerals 70 and 72. Thus, the thin layer of insulating material or tape 20 is held in the groove 68 by means of the vacuum in the manifold 66 and the openings 70 and 72.

An actuating cam 74 is provided that engages a lever 76 pivotally mounted at one end on a pin 78 and having a roller 80 positioned at the other end thereof. This actuating cam is rotated in a clockwise direction to press the conductor 18 against the insulating material or tape 20 for initial 90° rotation of the roll 56.

As the conductor 18 and the insulating material or tape 20 leave the roll 56, they are positioned in engagement with one another as shown in FIG. 13 with the side of the tape 20 having the adhesive applied thereto facing downwardly as shown in this FIG. and in engagement with one surface of the conductor 18. The rolling and wrapping rolls for wrapping the tape or insulating material 20 around the conductor 18 are shown in FIGS. 14, 15, 16, 17 and 18. The first set of wrapping rolls 82 shown in FIG. 14 bends a portion of the tape 20 through a 45° angle. The next set of wrapping rolls 86 shown in FIG. 16 bends this portion again through another 45° angle. The grooved wrapping roll 88 shown in FIG. 17 turns this portion through another 45° angle so that the tape or insulating sheet 20 is now in engagement with both of the longer sides of the conductor 18 and with one of the narrow sides. The wrapping rolls 90 shown in FIG. 18 complete the wrapping of the conductor 18 and they form the tab 26 by forcing the excess materials 22 and 24 that extend from the edge of the conductor 18 into engagement with one another. Since the sides that are forced into engagement have adhesive material positioned thereon they adhere together to form the tab 26.

The wire feed rolls 58 continue to operate until a sufficient amount of wire has been fed through the system to form one coil 10. At this time, the wire feed rolls 58 stop, the forming and cutting die 60 is operated and the end of the coil, i.e., end 14, is transferred to the winding mandrel 62. The machine is again started into operation with the winding mandrel 62, winding the coil into the rectangular form as shown in FIG. 1. The measuring and cutoff roll 56 rotates until it makes one complete revolution. When it is stopped, the insulating material or tape 20 is cut by a perforating blade 94 positioned on the measuring and cutoff roll by a pair of bolts 96 and 98. The teeth 100 of the perforating blade 94 extend above the groove 68 positioned in the roll 56 as shown in FIGS. 11 and 12 so that they will perforate the thin sheet of insulating material or tape 20 once during each revolution of the measuring and cutoff roll 56. As stated previously, the measuring and cutoff roll 56 makes one revolution and then is stopped. The wire or conductor 18, however, continues to move an additional distance to provide the desired length of the conductor for forming the ends of the coil 10. The insulating sheet or tape 20 then breaks at the weakened portion at the perforating blade 94.

Thus, the winding and wrapping machine shown in FIGS. 9 through 18 provides a coil 10 comprised of a plurality of turns 11 and having the general configuration shown in FIG. 4. The turns 11 are then secured together by wrapping a pressure sensitive adhesive tape, in a direction generally at right angles with respect to the conductor 18 as shown at 34 and 36. After this operation, the coil 10 is then formed into its generally arcuate configuration as shown in the end view in FIG. 5 so that it may be placed in the dynamoelectric machine as shown in FIG. 6 through 8.

The present invention thus provides a dynamoelectric machine including a coil, preferably in the form of a field coil, which may be properly and easily positioned within a dynamoelectric machine. The coil includes tabs extending from one side of the conductor of the coil, or both sides thereof that engage either the housing of the dynamoelectric machine, or a pole piece, or both, to properly and firmly cushion and secure the coil in the dynamoelectric machine.

I claim:

1. A dynamoelectric machine comprising a housing member constructed of ferromagnetic material, a pole member constructed of ferromagnetic material affixed to said housing, a coil constructed of a number of turns of a conductor, said conductor being enclosed by a sheet of insulating material, said insulating material having an excess tab extending from said conductor, said tab being positioned in engagement with the ferromagnetic material of one said members to act as a cushion for holding the coil in position between said housing member and said pole member.

2. The combination of claim 1 in which said conductor has a generally oblong cross section and the tab extends from said conductor in the direction of the larger axis of said conductor.

3. The combination of claim 1 in which said insulating material has an adhesive joining said insulating material to said conductor and said tab is formed by a double layer of said material joined by the adhesive.

4. The combination of claim 3 in which said conductor has a generally oblong cross section and the tab extends from said conductor in the direction of the larger axis of said conductor.

5. The combination of claim 4 in which said sheet of insulating material is constructed of crepe paper.

6. The combination of claim 3 in which said housing member is generally cylindrical in configuration and said pole member has a first portion having a surface with radius of curvature substantially equal to the radius of curvature of the inner diameter of said housing member and positioned in engagement therewith and a second arcuate portion spaced from said housing member, said second arcuate portion having a radius of curvature substantially equal to the inner diameter of said housing member and said surface of said first portion, said coil being positioned around the first portion of said pole member and in engagement with the inner surface of said housing member and the second arcuate portion of said pole member.

7. The combination of claim 6 in which said tab engages the second arcuate portion of said pole member.

8. The combination of claim 3 in which said coil has first and second end portions that are free of said sheet of insulating material.

9. The combination of claim 1 in which said sheet of insulating material is constructed of crepe paper.

10. The combination of claim 1 in which said coil has first and second end portions that are free of said sheet of insulating material.

11. The combination of claim 1 in which said housing member is generally cylindrical in configuration and said pole member has a first portion having a surface with radius of curvature substantially equal to the radius of curvature of the inner diameter of said housing member and positioned in engagement therewith and a second arcuate portion spaced from said housing member, said second arcuate portion having a radius of curvature substantially equal to the inner diameter of said housing member and said surface of said first portion, said coil being positioned around the first portion of said pole member and in engagement with the inner surface of said housing member and the second arcuate portion of said pole member.

12. The combination of claim 11 in which said tab engages the second arcuate portion of said pole member.